Patented Aug. 10, 1926.

1,595,457

UNITED STATES PATENT OFFICE.

MELVIN DE GROOTE, OF ST. LOUIS, AND EDWARD H. KEISER, OF CLAYTON, MISSOURI, ASSIGNORS TO WM. S. BARNICKEL & COMPANY, OF WEBSTER GROVES, MISSOURI, A CORPORATION OF MISSOURI.

PROCESS FOR TREATING PETROLEUM EMULSIONS.

No Drawing. Application filed April 6, 1925. Serial No. 21,211.

This invention relates to the treatment of emulsions of mineral oil and water, such as petroleum emulsions, for the purpose of separating the oil from the water.

Petroleum emulsions of the kind referred to are commonly known as "cut oil", "roily oil", "bottom settlings", etc., and consist of oil constituting the continuous phase of the emulsion, droplets of water distributed throughout the body of oil and constituting the dispersed phase, and films of matter that encase the droplets of water.

Various processes have been devised for "breaking" emulsions of the character referred to, which processes contemplate treating the emulsion with a particular kind of substance or compound having a particular property or characteristic, and thereafter permitting the emulsion to remain in a quiescent state at a suitable temperature after treatment so as to cause the water of the emulsion to separate from the oil.

The pending application for patent of Melvin De Groote, Serial No. 757,737, filed December 23, 1924, described a process for breaking emulsions of the character referred to, which contemplates coating the walls of fissures in the films of such an emulsion with a substance that is capable of being wetted by water, thereby converting said fissures into water passageways through which the droplets of water in the films can escape and thereafter coalesce.

Our invention consists of a process for breaking such emulsions, which is characterized by the use of a certain water wettable substance or anti-water-proofing compound that forms a certain sub-division of the broad class of materials mentioned in the said De Groote application and which offers many inherent advantages over the broad class as a whole. The material that we propose to use to treat a petroleum emulsion to effect the separation of the oil and the water or brine consists of water insoluble salts of modified organic soap-forming materials. Specific examples of such insoluble salts of modified organic soap-forming materials are compounds obtained by the action of a chemical reagent on such organic material, as fatty acids, rosin or naphthenic acid. In using the expression "modified organic soap-forming material" to define the materials contemplated by our invention the term "soap-forming materials" is used to refer to a class of materials having the ability to combine with alkali to produce substances having cleansing properties, the term "organic" is used to exclude such inorganic materials as borax, soda ash, caustic soda, sodium silicate, sodium phosphate, etc., the term "water insoluble salts" is used to refer to salts of metals which are not soluble in water, thus excluding sodium, potassium, ammonium and lithium and the term "modified" is used to refer to the modification obtained by chemical reaction which bears a simple genetic relationship to the parent material.

As previously stated, our invention contemplates the use of materials which are modifications of insoluble salts of organic soap-forming materials. These modifications can be obtained by subjecting a fatty acid, rosin or naphthenic acid to the action of a chemical reagent so as to obtain a modified fatty acid, a modified rosin, or a modified naphthenate and subsequently producing therefrom the water insoluble salt. So long as the modification bears a simple genetic relationship to the original material and possesses most of its characteristics, or at least part of its fundamental characteristics, it will be equally valuable in producing a water insoluble substance of the kind above described. Oleic acid may be subjected to the action of hydrogen so as to produce a modified or hydrogenated fatty material, and the calcium salt of this material can be employed to advantage. Rosin alone can be sulphonated and hydrolyzed although it is extremely difficult to carry this out on a large scale. Therefore, the industrial sulphonation of rosin is most suitably carried out after its solution in oleic acid. The two are sulphonated simultaneously and handled in a manner similar to the manufacture of Turkey red oil. It should be noted that after washing there remains a modified rosin and hydroxystearic acid or other materials. By the action of suitable solvents at carefully regulated temperatures the modified fatty acids can be largely removed from the modified rosin. This material can then be converted into an insoluble salt and is of considerable value in the treatment of petroleum emulsions. It is possible to recover naphthenic acid and allied bodies from petroleum refinery sludges and such materials can be halogenized by the action of chlorine, resulting in chlorinated derivatives which can then be converted into insoluble salts.

There are two general methods that can be employed to produce these insoluble salts. The first method is to use a material of an acid-like nature, such as hydrogenated oleic acid, sulphonated rosin or chlorinated naphthenic acid and subject the same to the action of a base such as magnesium oxide. The second method is to convert such substances into a water soluble salt such as the sodium salt. A solution of the desired metallic salt, namely, ferric chloride, magnesium chloride or aluminum chloride, is added to the water soluble salt of the organic modified soap-forming material. The desired product is formed by double decomposition.

Materials of the kind above described are particularly adapted for use as treating agents to effect the separation of water and oil in petroleum emulsions, in that they can be prepared at a low cost, the method of preparing them is relatively simple, they have a relatively high treating ratio, they are easy to employ by solution in oil, they are stable and do not deteriorate when in storage, they are non-corrosive, they work equally well in most oil fields and are not materially affected by the composition of the brine in petroleum emulsions, they can be transported at a relatively low cost, as they do not contain inert material and they can be prepared wholly or in part from material which is often an industrial waste product and would be valueless for other purposes.

A treating agent formed from materials of the kind above referred to can be introduced into a producing well, it can be introduced into a conduit through which a petroleum emulsion is flowing, or it can be introduced into a tank in which a petroleum emulsion or petroleum emulsion sludge is stored, the quantity of treating agent that is required to break the emulsion depending upon the nature and age of the emulsion and varying in ratio from 1 barrel of treating agent to 2,000 barrels of emulsion to 1 barrel of treating agent to 20,000 barrels of emulsion. The treating agent can even be introduced into a producing well in such a way that it can become mixed with oil that is emerging from the ground before said water and oil enter the barrel of the well pump or the tubing up through which said water and oil flow to the surface of the ground. After treatment the emulsion is allowed to stand in a quiescent state at a suitable temperature so as to permit the water to separate from the oil, or it may be passed through a variety of apparatus, such as hay tanks, gun barrels, etc., such as are now commonly used in the operation of "breaking" petroleum emulsions.

Having thus described our invention, what we claim as new and desire to secure by Letters Patent is:

1. A process for the purpose described, characterized by subjecting a petroleum emulsion to the action of a treating agent composed of an insoluble salt of a modified organic soap-forming material, which bears a simple genetic relationship to the parent material from which it was derived.

2. A process for the purpose described, characterized by subjecting a petroleum emulsion to the action of a treating agent composed of an insoluble salt of a modified fatty soap forming material, which bears a simple genetic relationship to the parent material from which it was derived.

MELVIN DE GROOTE.
EDWARD H. KEISER.